United States Patent [19]
Harrell

[11] 3,750,865

[45] Aug. 7, 1973

[54] CROP DIRECTING DISC AND/OR ASSEMBLY

[75] Inventor: Larry D. Harrell, Albany, Ga.

[73] Assignee: Lilliston Corporation, Albany, Ga.

[22] Filed: June 3, 1971

[21] Appl. No.: 149,604

[52] U.S. Cl.................................. 198/211, 222/414
[51] Int. Cl............................................. B65g 29/00
[58] Field of Search..................... 198/211; 222/414, 222/410, 273; 171/33; 130/30 A

[56] References Cited
UNITED STATES PATENTS
1,438,189   12/1922   Perdue et al......................... 222/273
290,538     12/1883   Cook .................................. 222/273
2,894,663   7/1959    Loomans ........................ 222/410 X FOREIGN PATENTS OR APPLICATIONS
754,400     8/1956    Great Britain...................... 171/33

Primary Examiner—Evon C. Blunk
Assistant Examiner—Hadd S. Lane
Attorney—Newton, Hopkins & Ormsby

[57] ABSTRACT

A crop directing disc and/or assembly for use in transferring crops along a predetermined path in a harvesting operation. A crop directing assembly is constructed of a plurality of crop directing discs supported in axially spaced relationship and coaxially aligned relative to each other. Each of the crop directing discs are constructed of an integral piece of synthetic material in the form of a multi-sided figure, with the intersecting points between adjacent sides of the disc rounded to present a substantially smooth surface detailed for contacting crops in a transferring operation. The crop directing discs are provided with collar means extending axially outward from opposite surfaces of the discs, with alignment means in the form of a plurality of axially extendint male lugs and a plurality of axially formed female openings detailed for effecting an angular alignment between adjacent discs. The crop directing discs are supported in an assembled relationship by a rotatable support shaft detailed for effecting a driving of the discs in response to rotary movement of the support shaft.

1 Claim, 4 Drawing Figures

PATENTED AUG 7 1973
3,750,865
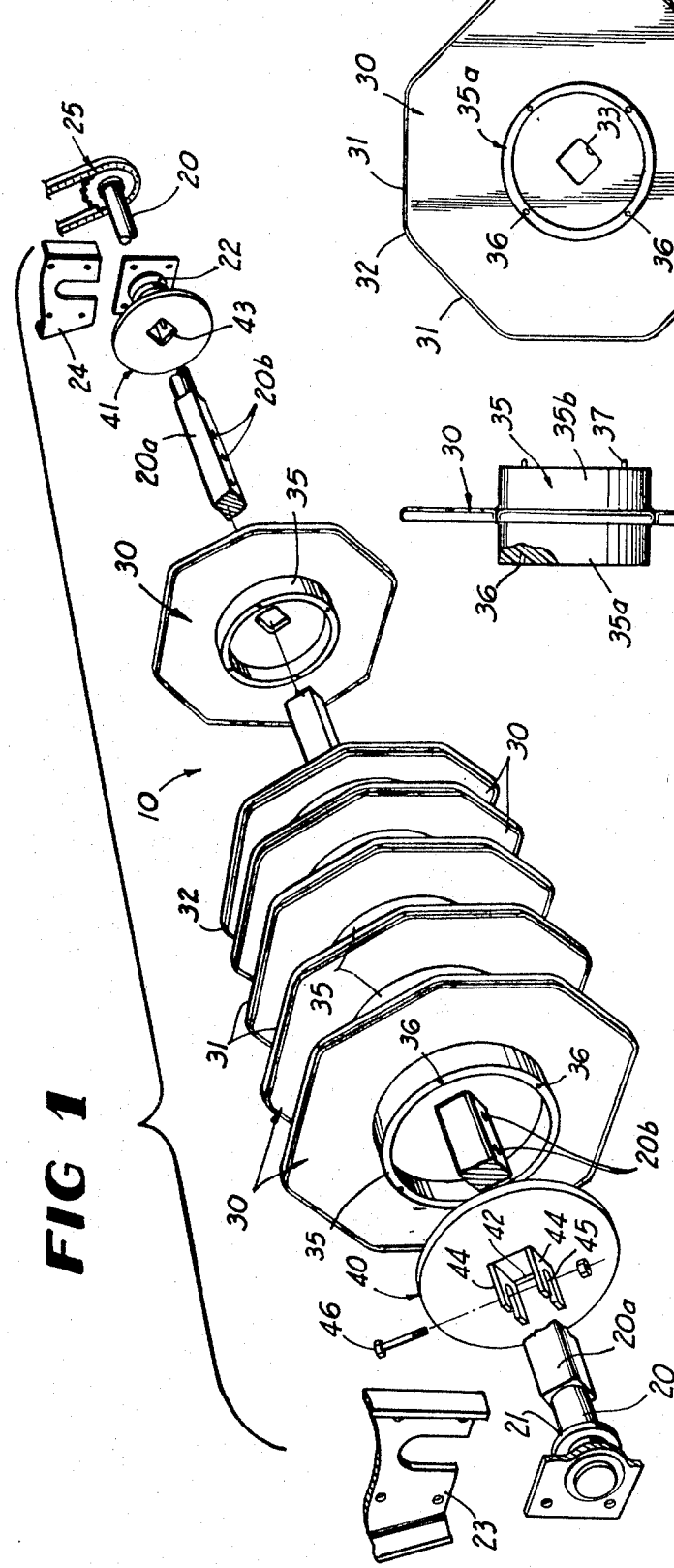
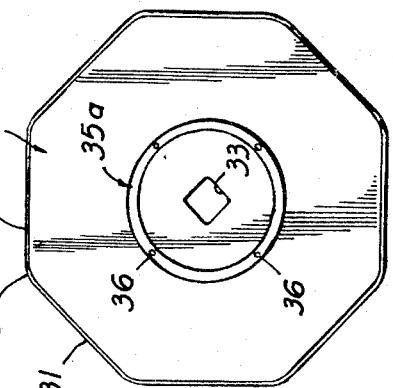
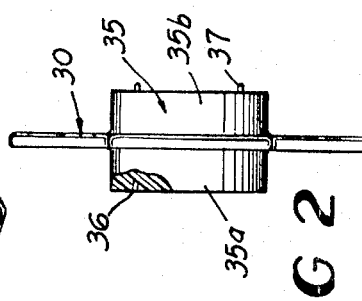
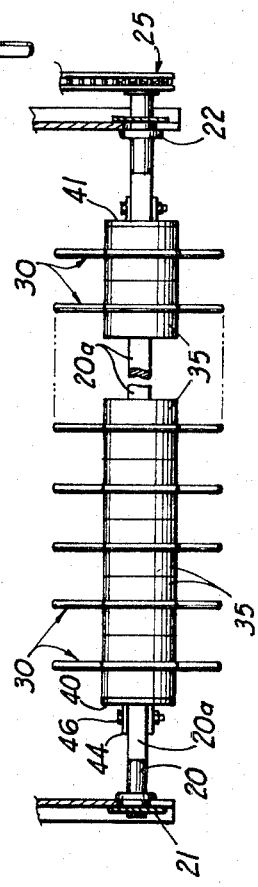
INVENTOR
LARRY D. HARRELL
BY: Newton, Hopkins, & Ormsby
ATTORNEYS

CROP DIRECTING DISC AND/OR ASSEMBLY

BACKGROUND OF THE INVENTION

This invention relates to a rotatably driven transfer assembly for use in transferring a crop along a predetermined path from one location to a second location in a harvesting operation. More particularly, this invention is directed to a disc element for use in a crop directing disc assembly.

In the harvesting of crops, such as peanuts or the like, the crops are transferred from one location to a second location, such as, in effecting a windrow of the crop or for effecting a transfer of the crops from gathering facilities to crop threshing facilities.

There have been a number of attempts to provide an effective crop directing assembly capable of transferring crops in a harvest operation. However, the prior art crop directing means were complex in construction, uneconomical to manufacture and unreliable in performance. The prior art crop directing assemblies include irregular or sharp circumferential edges, which sharp edges cause the crops to become entangled around the directing element and entangled around the rotary supporting shaft means.

Another problem with the prior art crop directing assemblies results from the excessive weight of the assemblies, requiring a considerable amount of reinforcing in the supporting framework and requiring additional drive means for effecting operation of these assemblies.

SUMMARY OF THE INVENTION

It is therefore a primary object of the present invention to provide a crop directing disc effective for use in transferring crops in a harvesting operation.

Another object of this invention is to provide a crop directing assembly for use in effecting a transfer of crops in a harvesting operation.

A further object of this invention is to provide a crop directing disc which presents a substantially smooth surface detailed for engaging and effecting a transfer of a crop along a predetermined path.

A still further object of this invention is to provide a crop directing disc which is constructed in the form of a multisided figure having rounded intersecting points between adjacent sides of the figure.

Still another object of this invention is to provide a crop directing disc which is constructed as an integral piece of synthetic material.

Yet another object of this invention is to provide a crop directing disc including coaxially formed circular collar means extending axially outward a predetermined distance from opposite surfaces of the disc.

Another object of this invention is to provide a crop directing disc constructed to include an impervious planar surface extending radially outward from the disc collar means.

A further object of this invention is to provide a crop directing disc having means for angularly aligning one disc relative to an adjacent crop directing disc.

A still further object of this invention is to provide a crop directing assembly including means for supporting a plurality of crop directing discs in axially spaced coaxial aligned relationship relative to each other.

An additional object of this invention is to provide a crop directing disc and/or crop directing disc assembly which is simple in construction, economical to manufacture and reliable in performance.

The above stated objects are obtained and the disadvantages of the prior art are overcome by the present invention which basically includes a crop directing disc constructed of an integral piece of plastic material formed of an eight-sided figure wherein the intersecting points between adjacent sides are rounded to present a substantially smooth surface portion. The crop directing disc is provided with coaxially formed circular collar means extending axially outward from opposite surfaces of the crop directing disc. The collar means includes a plurality of axially extending male alignment lugs and a plurality of axially formed complementary female alignment openings whereby adjacent crop directing discs can be angularly positioned in alignment relative to each other. An important feature of the present invention resides in the detailed construction of the multi-sided figure with the rounded intersecting points and including the coaxially aligned circular collar means detailed in radial spacing from the axis of the discs and detailed in mating relationship with the collar means of adjacent discs to present a smooth surface radially spaced from the axis of the disc whereby the disc assembly prevents crops from becoming entangled therearound in a transfer operation.

The crop directing discs are adapted to be supported for rotary driving movement on a support shaft and include means for clamping a plurality of discs in an axially set position relative to the support shaft and further including means for varying the number of discs supported on the support shaft.

Still other objects and advantages of the details of construction of the present invention will become apparent upon reading the following description of the illustrative embodiment with reference to the attached drawing wherein like reference numerals have been used to refer to like parts throughout the several figures, and wherein:

DESCRIPTION OF THE FIGURES OF DRAWING

FIG. 1 is an exploded perspective view of a crop directing assembly embodying the principles of the present invention;

FIG. 2 is an enlarged end elevational view of one of the crop directing discs shown in FIG. 1, with certain parts broken away and shown in section for purpose of clarity, FIG. 3 is a side elevational view of FIG. 2; and FIG. 4, is a fragmentary end elevational view showing the disc assembly in an assembled relationship, with parts broken away and shown in section for purpose of clarity.

DESCRIPTION OF THE ILLUSTRATIVE EMBODIMENT

Referring now to the drawings, the crop directing assembly 10 embodying the principles of the present invention includes a support shaft 20 rotatably supported by conventional bearing means 21, 22 within frame means 23, 24. Shaft 20 is driven in a transferring operation by means of a conventional sprocket and chain drive means 25 connected to a right extended end of shaft 20. The sprocket and chain drive means 25 is connected to a conventional power driving source (not shown) for effecting a rotation of the shaft 20 and the crop directing assembly 10.

As shown in FIG. 1, the crop directing assembly 10 includes a plurality of crop directing discs 30 coaxially supported on shaft 20 in axially spaced relationship. Each of the crop directing discs 30 is constructed in the shape of an eight-sided figure, with the intersection points between each of the sides of the figure being slightly rounded to present a smooth outer edge for contacting and directing crops in a harvesting operation. The sides of the crop directing disc are represented generally by reference numeral 31 and the rounded intersecting points between adjacent sides are represented by reference numeral 32. As shown in FIG. 3, the eight-sided figure is detailed such that each of the sides 31 of the crop directing disc is substantially perpendicular to a radius line extending outwardly from the crop directing disc axis and presents a number of circumferential edges having components of transfer surfaces angularly disposed relative to a line drawn tangent to the rounded corners 32, whereby the angularly disposed sides 31 will engage and effect a displacement of a crop from one location to a second location along a predetermined path. The eight-sided figure construction will effect a crop transfer operation with a minimum amount of aggressive contact with the crop, to thereby prevent the crop from becoming entangled with the crop directing assembly.

Each of the crop directing discs 30 is provided with a substantially square opening 33 centrally arranged therein and detailed for receiving a complementary square surface portion 20a of the support shaft 20. The relationship of the disc square opening 33 and shaft square surface portion 20a will effect a rotation of the crop directing disc 30 in response to rotation of shaft 20. The crop directing discs 30 are supported in axially spaced relationship on shaft 20, with the axial spacing being controlled by collar means 35 formed integrally with each of the discs 30. Disc collar means 35 is detailed to include a concentrically arranged circular collar portion 35a, 35b extending axially outward from opposite surfaces of disc 30.

Disc collar portion 35a is provided with a plurality of axially formed female alignment openings 36 and disc collar portion 35b is provided with a plurality of axially extending male alignment projections 37 formed complementary relative to each other whereby the male alignment projections 37 of one disc will engage in mating relationship with the female alignment openings 36 of an adjacent disc collar means for effecting an angular alignment of discs 30 relative to each other. In assembled relationship, the axial edge of collar 35a of one disc is in abutting contact with an axial edge of an adjacent disc collar 35b with the axial dimensions of collars 35a, 35b controlling the axial spacing between adjacent discs 30.

The crop directing discs 30 are secured in an axially set position on rotatable shaft 20 by means of a pair of end plate members 40, 41. End plate members 40, 41 are provided with openings 42, 43, respectively, formed complementary to the square surface portion 20a of support shaft 20. End plate members 40, 41 include axially extending bracket means 44 which contact opposite sides of the shaft square surface portion 20a. Each bracket 44 is provided with elongated and aligned adjustment slots 45 for receiving a conventional connecting bolt means 46. In an assembled relationship, the connecting bolt means 46 is inserted through adjustment slots 45 and through a selected one of a plurality of axially spaced openings 20b provided in rotatable support shaft 20.

The eight-sided configuration of discs 30, with the smooth rounded corners and the collar means 35 will ensure that the crops are directed from one location to a second location along a predetermined path without becoming entangled around the rotary support shaft 20.

The crop directing discs 30 are constructed as an integral piece of synthetic material, such as plastic, to provide the required rigid crop directing characteristics and light weight needed to reduce the supporting and driving requirements for a crop directing assembly.

The surface portion of the crop directing disc 30 extending radially outward from collar means 35 is constructed of an impervious area to prevent crops from becoming entangled therewith in a transfer operation.

OPERATION

In utilizing the crop directing assembly 10 involving the principles of the present invention, rotatable support shaft 20 is provided with the desired number of crop directing discs 30. After the required number of crop directing discs 30 have been placed in abutting relationship on support shaft 20, as described hereinabove, end plate members 40, 41 are inserted over opposite ends of shaft 20 and secured in an axially set position to clamp the discs 30 therebetween. A final detailed clamping adjustment of the discs 30 between the plate members 40, 41 is effected by compressing the discs 30 in mating relationship relative to each other and securing the connecting bolts 46 at a set position within the elongated adjustment slots 45.

After the crop directing discs 30 have been assembled on support shaft 20, the shaft is supported within the frame elements 23, 24 by the conventional bearing means 21, 22. With the shaft 20 rotatably supported in the bearings, a drive means 25 is connected thereto for effecting a rotary movement of shaft 20 and the crop directing discs 30.

In a crop transferring operation, the crops will be introduced onto the assembly 10 from a direction substantially perpendicular to the axis of the assembly and the crop directing disc assembly will effect a transfer of the received crop along a predetermined path to a second location.

It now becomes apparent that the above described illustrative embodiment embodying the principles of the present invention is capable of obtaining the above stated objects and advantages. It is obvious that those skilled in the art may make modifications in the details of construction without departing from the spirit of the invention which is to be limited only by the scope of the appended claims.

What is claimed is:

1. A crop directing assembly for use in transferring crops along a predetermined path in a harvesting operation comprising a rotatably mounted shaft of polygonal cross section, a plurality of flat polygonal discs mounted on said shaft, each disc having a central opening corresponding in shape to the cross sectional shape of the shaft and fitting snugly about said shaft, said discs being formed of synthetic material, each disc being formed with a collar spaced outwardly from and surrounding its central opening, said collar being perpendicular to the flat surfaces of the disc and extending from each side of the disc in a direction parallel to said shaft, each collar being provided in one of its annular end surfaces with spaced openings and in its other annular end surface with outwardly projecting lugs, said lugs and openings being so positioned as to register with the respective openings and lugs of adjacent discs when said discs are assembled on said shaft, whereby the lugs may be received in the openings, and an end plate mounted on the shaft at each end of said plurality of discs, each end plate having a polygonal opening snugly fitting about said shaft and also having a pair of parallel axially extending bracket means extending axially of said shaft, each bracket means engaging one of two opposite sides of the shaft and having a slot extending axially along said side, said shaft being provided with a series of spaced holes extending between said opposite sides and adapted to register selectively with said slots, a bolt extending through said slots of each end plate and one of said openings, and nuts on said bolts for clamping said end plates in position.

* * * * *